United States Patent [19]
Yuki et al.

[11] Patent Number: 5,623,622
[45] Date of Patent: Apr. 22, 1997

[54] MEMORY ACCESS CONTROL SYSTEM WHICH PROHIBITS A MEMORY ACCESS REQUEST TO ALLOW A CENTRAL CONTROL UNIT TO PERFORM SOFTWARE OPERATIONS

[75] Inventors: Keiko Yuki; Yoso Igi; Fumiaki Tahira, all of Kawasaki, Japan

[73] Assignee: Fujitsu Limited, Kawasaki, Japan

[21] Appl. No.: 953,965

[22] Filed: Sep. 30, 1992

[30] Foreign Application Priority Data

Oct. 8, 1991 [JP] Japan ................................ 3-260271

[51] Int. Cl.⁶ .................................................. G06F 13/20
[52] U.S. Cl. ..................... 395/427; 395/250; 395/280; 395/287; 395/308; 395/405
[58] Field of Search ............................... 364/200 MS File, 364/900 MS File; 395/400 MS File, 425 MS File

[56] References Cited

U.S. PATENT DOCUMENTS

| 4,298,959 | 11/1981 | Sundermeyer et al. | 395/425 |
|---|---|---|---|
| 4,462,084 | 7/1984 | Greenwood | 395/250 |
| 4,648,029 | 3/1987 | Cooper et al. | 364/200 |
| 4,744,078 | 5/1988 | Kowalczyk | 95/325 |
| 4,924,427 | 5/1990 | Savage et al. | 364/900 |
| 4,933,845 | 6/1990 | Hayes | 364/200 |
| 5,097,437 | 3/1992 | Larson | 395/775 |
| 5,212,795 | 5/1993 | Hendry | 395/725 |
| 5,235,694 | 8/1993 | Umeda | 395/425 |
| 5,301,350 | 4/1994 | Rogan et al. | 395/600 |

*Primary Examiner*—Reba I. Elmore
*Attorney, Agent, or Firm*—Staas & Halsey

[57] ABSTRACT

A memory access control system which performs a DMA transfer and allows a central control unit to perform a specific, required software operation. A central control unit sets a flag after running the specific software operation. The DMA transfer includes a first phase and a second phase, the first phase being a first transfer between a main memory and a first buffer memory and then a successive, second transfer between the main memory and a second buffer memory. The second phase is a transfer between a respective buffer memory and an external memory. A first DMA controller requests the first phase and controls the transfer of the second phase from a respective buffer memory when a transfer of the first phase from the main memory to the respective buffer memory ends, and prohibits a request for the first phase when the first transfer ends during a transfer of the second phase from the second buffer memory. A DMA request controller controls the request for the first phase and prohibits a request when the second transfer of the first phase ends and cancels the prohibition of a request when the flag of the central control unit is set. In response to a request for the first phase, an external bus control unit halts the operation of the central control unit and performs the first and second transfers of the first phase.

10 Claims, 6 Drawing Sheets

MEMORY ACCESS CONTROL SYSTEM WHICH PROHIBITS A MEMORY ACCESS REQUEST TO ALLOW A CENTRAL CONTROL UNIT TO PERFORM SOFTWARE OPERATIONS

BACKGROUND OF THE INVENTION

The present invention generally relates to intermittent direct memory access (DMA) control systems, and more particularly to an intermittent DMA control system which intermittently carries out a DMA in data blocks and resumes the DMA after ending a software process required by a central control unit.

In certain kinds of data communication equipment, a hard disk or a floppy disk is provided with respect to a central control unit. In such data communication equipment, data transmission and reception are made between a main memory of the central control unit and a file memory control unit which controls write and read with respect to the hard disk or floppy disk. Data transmission and reception between the main memory and the file memory control unit are made intermittently in predetermined data blocks by DMA.

When carrying out such an intermittent DMA, it is desirable to improve the data transfer speed to and from the file memory regardless of the communication speed between the main memory and the file memory control unit.

FIG. 1 shows an example of a conventional intermittent DMA control system. The intermittent DMA control system shown in FIG. 1 includes a central control unit (CC) 11 which controls the entire system, a bus 12 of the central control unit 11, a main memory (MM) 13 which stores programs of the system and the like, a floppy disk unit (FD) 14, a hard disk unit (HD) 15, a file memory control unit (FMC) 16 which controls the floppy disk unit 14 and the hard disk unit 15, and an external bus control (PBC) unit 19 which carries out a bus control between the bus 12 of the central control unit 11 and the file memory control unit 16. The file memory control unit 16 includes an input side bus 17, an output side bus 18, a microprocessor unit (MPU) 20, dual port buffer memories (BM0) 21 and (BM1) 22, a DMA controller (DMAC1) 23 which controls DMA requests, a floppy disk controller (FDC) 24 which controls the floppy disk unit 14, and a small computer system interface (SCSI) protocol controller (SPC) 25 which controls the hard disk unit 15. The external bus control unit 19 includes a DMA controller (DMAC0) 26 which controls the DMA transfer.

The central control unit 11 is coupled to the main memory 13 and the external bus control unit 19 via the bus 12. The central control unit 11 transmits and receives instructions, data and the like between the main memory 13 and the floppy disk unit 14 or the hard disk unit 15 by controlling the file memory control unit 16 via the external bus control unit 19 using programs stored in the main memory 13. The buffer memories 21 and 22 of the file memory control unit 16 temporarily store the instructions, data and the like when transferring the same.

The transmission and reception of the instructions and data between the main memory 13 and the file memory control unit 16 are made by DMA transfer based on the control of the DMA controller 26 of the external bus control unit 19. This DMA transfer is successively made between the main memory and the buffer memories 21 and 22 of the file memory control unit 16. The transmission and reception of instructions, data and the like between the buffer memories 21 and 22 and the floppy disk control unit 24 or the SCSI protocol controller 25 are made by DMA transfer based on the control of the DMA controller 23. In addition, the DMA controller 23 generates a DMA request which requests DMA transfer with respect to the external bus control unit 19. The microprocessor unit 20 controls various parts of the file memory control unit 16.

FIG. 2 shows an operation time chart of the conventional intermittent DMA control system shown in FIG. 1. A description will now be given of the data transfer and the like in the conventional intermittent DMA control system with reference to FIG. 2, and the write transfer operation from the main memory 13 to the floppy disk controller 24 or the SCSI protocol controller 25 in particular.

First, a data transfer command is written from the central control unit 11 to the file memory control unit 16. The file memory control unit 16 which receives the data transfer command sets the DMA controller 23 so as to output a DMA request DMAREQ which requests DMA transfer with respect to the DMA controller 26 of the external bus control unit 19. Hence, the DMA request DMAREQ is output from the DMA controller 23. Responsive to this DMA request DMAREQ, the DMA controller 26 puts the central control unit 11 to a halt state, and starts a data transfer between the main memory 13 and the buffer memory 21. The halt state of the central control unit 11 continues during the time in which the DMA request DMAREQ is output.

The DMA controller 26 returns a DMA acknowledge DMAACK every time the DMA request DMAREQ is received from the DMA controller 23. At the same time, the DMA controller 26 reads a predetermined amount of data and the like from the main memory 13 and writes the read data and the like into the buffer memory 21. Such a process is repeated until the buffer memory 21 becomes full.

When the buffer memory 21 becomes full, the firmware of the microprocessor unit 20 of the file memory control unit 16 generates a communication start command. As a result, the floppy disk controller 24 or the SCSI protocol controller 25 outputs a data request DREQ if data write is possible. Responsive to the data request DREQ, the DMA controller 23 outputs an acknowledge ACK and transfers the data and the like within the buffer memory 21 to the floppy disk controller 24 or the SCSI protocol controller 25 by DMA transfer. Accordingly, data write is made with respect to the floppy disk unit 14 or the hard disk unit 15. The DMA controller 23 maintains the microprocessor unit 20 in the halt state during the DMA transfer.

During the data transfer from the buffer memory 21 to the floppy disk controller 24 or the SCSI protocol controller 25, the DMA controller 26 of the external bus control unit 19 makes a data transfer between the main memory 13 and the buffer memory 22. If the buffer memory 22 becomes full before the data transfer between the buffer memory 21 and the floppy disk controller 24 or the SCSI protocol controller 25 ends, the DMA controller 23 stops outputting the DMA request DMAREQ, and consequently, the external bus control unit 19 cancels the halt state of the central control unit 11 until the next DMA request DMAREQ is output.

Next, when the data transfer from the buffer memory 21 ends, the DMA controller 23 outputs the DMA request DMAREQ. Hence, the data transfer from the main memory 13 to the buffer memory 21 is resumed.

The above described operation is repeated until all of the data to be transferred is transferred from the main memory 13. Therefore, an intermittent DMA transfer is made between the main memory 13 and the floppy disk controller 24 or the SCSI protocol controller 25.

On the other hand, in the conventional intermittent DMA control system shown in FIG. 1, the read transfer operation from the floppy disk controller 24 or the SCSI protocol controller 25 to the main memory 13 is made as follows.

First, a data transfer command is transmitted from the central control unit 11 to the file memory control unit 16. Responsive to the data transfer command, the file memory control unit 16 puts the microprocessor unit 20 in the halt state, and starts a data transfer from the floppy disk controller 24 or the SCSI protocol controller 25 to the buffer memory 21 depending on the control of the DMA controller 23.

When the buffer memory 21 becomes full, a data transfer is made from the floppy disk controller 24 or the SCSI protocol controller 25 to the buffer memory 22, and at the same time, a DMA request DMAREQ is output from the file memory control unit 16. As a result, the DMA controller 26 puts the central control unit 11 to the halt state, and starts a data transfer from the buffer memory 21 to the main memory 13. If the data transfer from the buffer memory 21 to the main memory 13 ends before the data transfer from the floppy disk controller 24 or the SCSI protocol controller 25 to the buffer memory 22 ends, the output of the DMA request DMAREQ from the file memory control unit 16 stops and the DMA controller 26 cancels the halt state of the central control unit 11 until the next DMA request DMAREQ is output.

The above described operation is repeated until all of the data to be transferred is transferred from the floppy disk unit 14 or the hard disk unit 15. Hence, an intermittent DMA transfer is made between the floppy disk controller 24 or the SCSI protocol controller 25 and the main memory 13.

If the data transfer speed from the main memory 13 to the buffer memories 21 and 22 is sufficiently large compared to the data transfer speed from the buffer memories 21 and 22 to the floppy disk controller 24 or the SCSI protocol controller 25, the halt state of the central control unit 11 is cancelled at appropriate time intervals for appropriate times. However, if the difference between the two data transfer speeds is very small or zero or, the data transfer speed from the main memory 13 to the buffer memories 21 and 22 is slower, the time intervals at which the halt state of the central control unit 11 is cancelled may become long or the time in which the halt state is cancelled may become short.

On the other hand, the central control unit 11 makes a software operation which needs to be carried out periodically during the time in which the halt state is cancelled, such as monitoring the timer. However, if the data transfer speed from the main memory 13 to the buffer memories 21 and 22 is slower than the data transfer speed from the buffer memories 21 and 22 to the floppy disk controller 24 or the SCSI protocol controller 25, the halt state is not cancelled for a sufficiently long time, and there is a problem in that the central control unit 11 cannot carry out the software operation which needs to be carried out periodically.

SUMMARY OF THE INVENTION

Accordingly, it is a general object of the present invention to provide a novel and useful intermittent DMA control system in which the problem described above is eliminated.

Another and more specific object of the present invention is to provide an intermittent DMA control system comprising a central control unit (CC) including a flag which is set when a software operation thereof ends, a main memory coupled to the central control unit, a file memory control unit including first and second dual port buffer memories, an external memory controller for controlling an external memory, a first DMA controller for controlling a DMA transfer between the first and second buffer memories and the external memory and for generating a DMA request which requests a DMA transfer between the main memory and the first and second buffer memories and a DMA request controller coupled to the first DMA controller for controlling the DMA request output from the first DMA controller, and an external bus control unit, coupled between the main memory and the first and second buffer memories, for putting the central control unit in a halt state and for successively making the DMA transfer from the main memory to the first and second buffer memories in response to the DMA request, where the first DMA controller controls the DMA transfer from one of the first and second buffer memories to the external memory controller when the DMA transfer to the one buffer memory ends and stopping output of the DMA request when the DMA transfer to the first buffer memory ends during the DMA transfer from the second buffer memory, and the DMA request controller makes an operation of prohibiting the DMA request from being output from the first DMA controller when the DMA transfer from the main memory to the second buffer memory ends and cancels the prohibiting operation when the flag is set, so that an intermittent DMA transfer is carried out from the main memory to the external memory controller. According to the intermittent DMA control system of the present invention, it is possible to cancel the halt state of the central control unit for a required time so that the central control unit can carry out the software operation which needs to be carried out periodically, regardless of whether the data transfer speed between the main memory and the first and second buffer memories is less than or equal to the data transfer speed between the first and second buffer memories and the external memory controller. Therefore, it is possible to make the data transfer speed on the side of the file memory control unit high without having to take into consideration the data transfer speed between the main memory and the file memory control unit.

Other objects and further features of the present invention will be apparent from the following detailed description when read in conjunction with the accompanying drawings.

DESCRIPTION OF THE PREFERRED EMBODIMENTS

Figure 3:
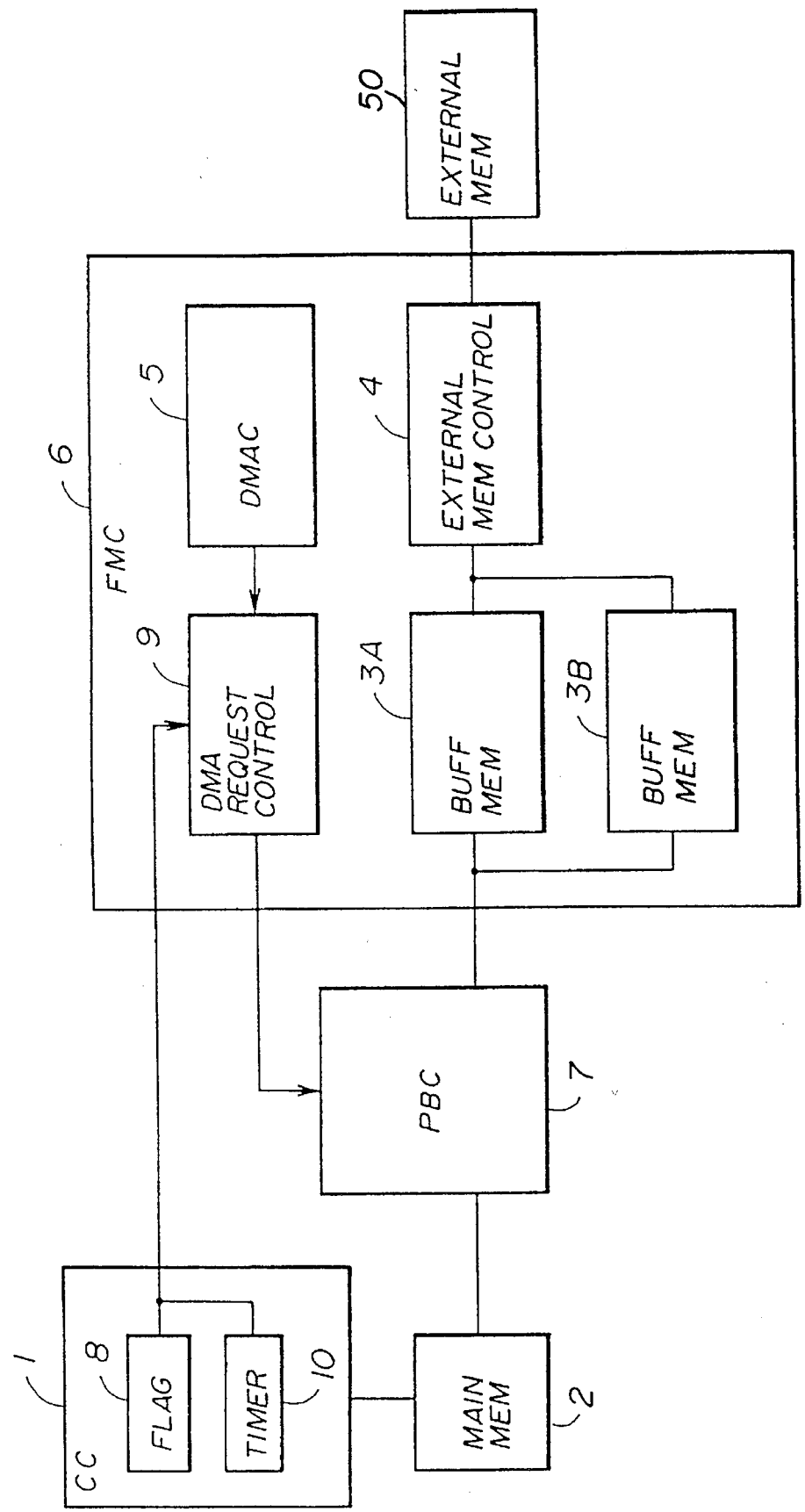
FIG. 3 is a system block diagram for explaining the operating principle of the present invention.

First, a description will be given of the operating principle of the present invention, by referring to FIG. 3. For example, a data communication system to which the present invention is applied includes a central control unit (CC) 1, a main memory (MM) 2 coupled to the central control unit 1, a file memory control unit (FMC) 6, and an external bus control unit (PBC) 7 which are coupled as shown in FIG. 3.

The file memory control unit 6 includes dual port buffer memories (BUFF MEM) 3A and 3B, an external memory controller (EXTERNAL MEM CONTROL) 4 for controlling an external memory (EXTERNAL MEM) 50, a DMA controller 5, and a DMA request controller (DMA REQUEST CONTROL) (DMAC) 9. The DMA controller 5 controls a DMA transfer between the buffer memories 3A and 3B and the external memory controller 4, and generates a DMA request which requests a DMA transfer between the main memory 2 and the buffer memories 3A and 3B. The external bus control unit 7 puts the central control unit 1 to the halt state in response to the DMA request from the DMA controller 5, and controls the DMA transfer between the main memory 2 and the buffer memories 3A and 3B.

The external bus control unit 7 successively makes the DMA transfer from the main memory 2 to the buffer memories 3A and 3B in response to the DMA request from the DMA controller 5. When the data transfer to one of the buffer memories 3A and 3B ends, the DMA controller 5 controls the DMA transfer from the one buffer memory to the external memory controller 4. In addition, if the DMA transfer to the buffer memory 3B ends during the DMA transfer from the buffer memory 3A, the DMA controller 5 stops outputting the DMA request.

On the other hand, the central control unit 1 is provided with a flag 8 and a timer 10. The flag 8 is set when the software operation which is periodically carried out by the central control unit 1 ends.

The DMA request controller 9 prohibits the DMA request when the data transfer from the main memory 2 to the buffer memory 3B ends, and cancels the prohibition of the DMA request if the flag 8 is set. As a result, it is possible to carry out an intermittent DMA transfer from the main memory 2 to the external memory controller 4.

In this case, the timer 10 of the central control unit 1 counts a predetermined time from the time when the halt state of the central control unit 1 is cancelled. Hence, if the flag 8 is not set within this predetermined time, the DMA request controller 9 cancels the prohibition of the DMA request.

In this data communication system shown in FIG. 3, the external bus control unit 7 puts the central control unit 1 into the halt state while the DMA controller 5 generates the DMA request. The external bus control unit 7 successively makes the DMA transfer from the main memory 2 to the buffer memories 3A and 3B, and when the data transfer to one of the buffer memories 3A and 3B ends, the DMA controller 5 controls the DMA transfer from this one buffer memory to the external memory controller 4. The DMA controller 5 stops outputting the DMA request if the DMA transfer to the buffer memory 3B ends while making the DMA transfer from the buffer memory 3A.

By the provision of the flag 8 within the central control unit 1 and the DMA request controller 9 within the file memory control unit 6, the DMA request is prohibited when the data transfer from the main memory 2 to the buffer memory 3B ends, and the prohibition of the DMA request is cancelled if the flag 8 is set. Further, by the provision of the timer 10 within the central control unit 1, the DMA request controller 9 cancels the prohibition of the DMA request if the flag 8 is not set within the predetermined time which is counted by the timer 10 from the time when the halt state of the central control unit 1 is cancelled.

Therefore, according to the intermittent DMA control system of the present invention, it is possible to carry out an intermittent DMA transfer from the main memory 2 to the external memory controller 4. In addition, even if the data transfer speed from the main memory 2 to the buffer memories 3A and 3B is slower than the data transfer speed from the buffer memories 3A and 3B to the external memory controller 4, it is possible to cancel the halt state of the central control unit 1 for an appropriate time and guarantee execution of the software operation of the central control unit 1 which needs to be carried out periodically.

Figure 1:
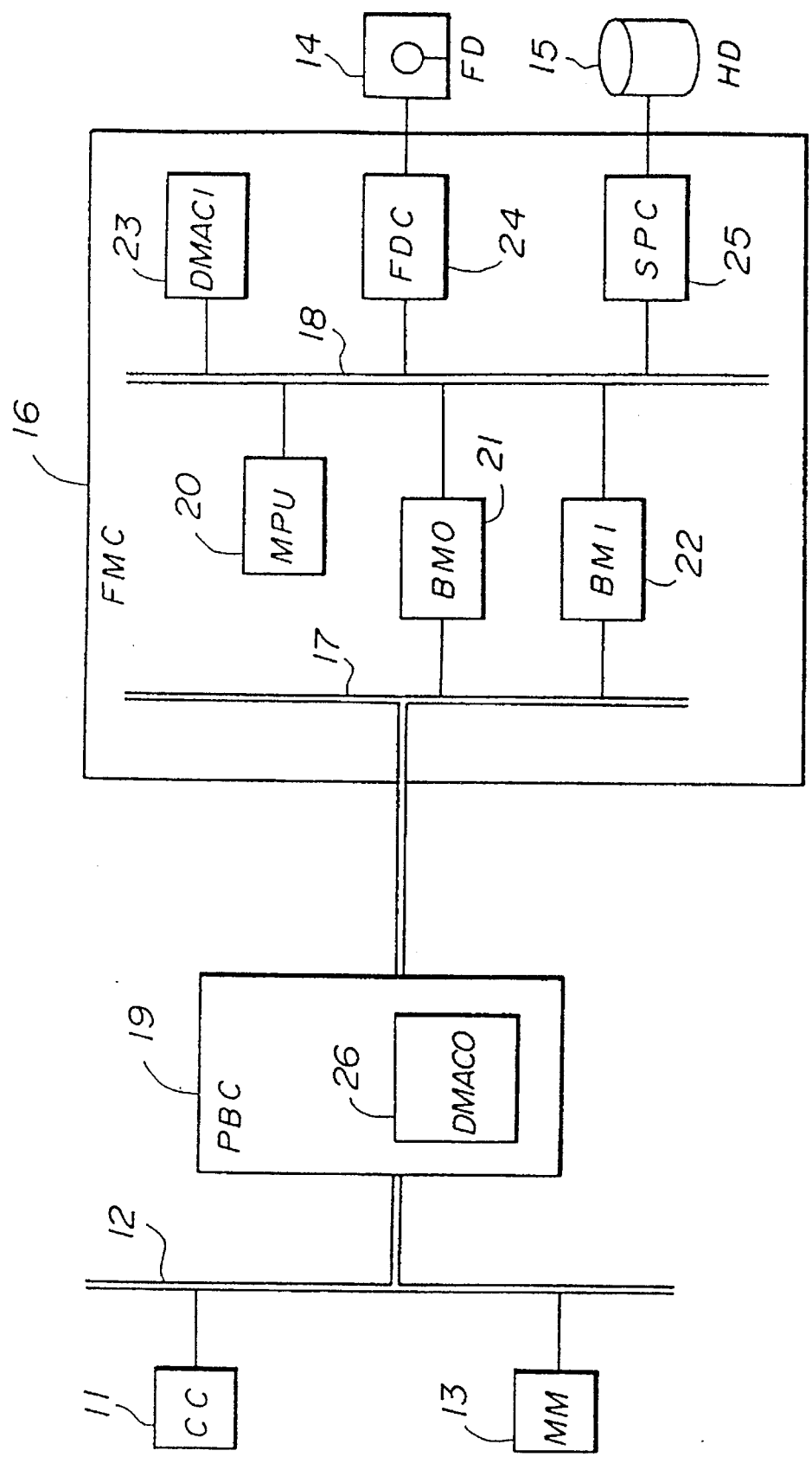
FIG. 1 is a system block diagram showing an example of a conventional intermittent DMA control system.
Figure 2:
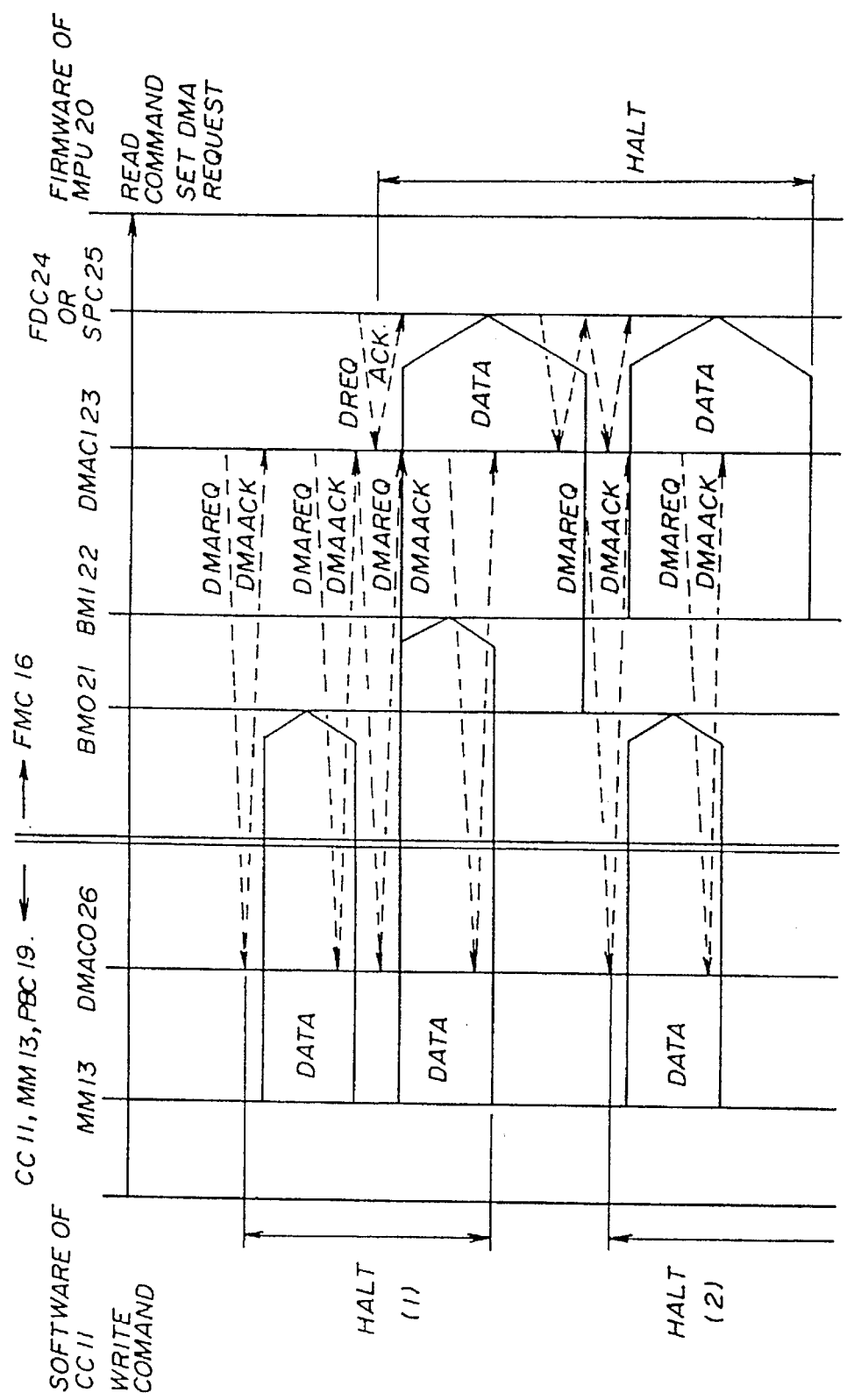
FIG. 2 is an operation time chart for explaining the operation of the conventional intermittent DMA control system shown in FIG. 1.
Figure 4:
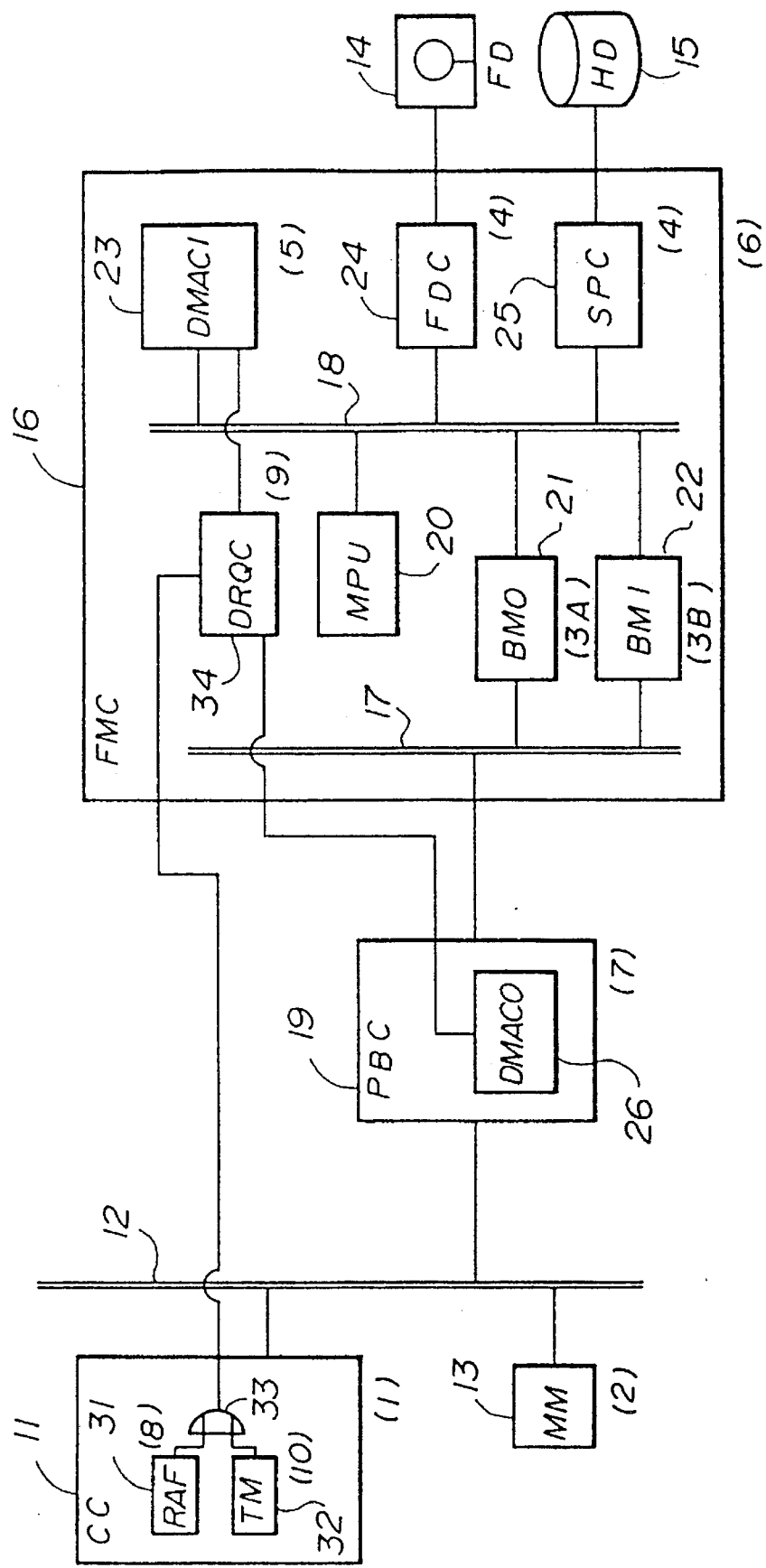
FIG. 4 is a system block diagram showing an embodiment of an intermittent DMA control system according to the present invention.

Next, a description will be given of an embodiment of an intermittent DMA control system according to the present invention, by referring to FIG. 4. In FIG. 4, those parts which are the same as those corresponding parts in FIG. 1 are designated by the same reference numerals, and a description thereof will be omitted. Furthermore, numerals shown in brackets in FIG. 4 correspond to those of the parts in FIG. 3.

The central control unit 11 includes a regular access flag (RAF) 31 which is set when the periodical software operation of the central control unit 11 ends, a timer (TM) 32 for counting a predetermined time, and an OR circuit 33. The file memory control unit 16 includes a DMA request controller (DRQC) 34 for controlling the DMA request DMAREQ which is transmitted from the file memory control unit 16 to the external bus control unit 19. An output of the OR circuit 33 is connected directly to the DMA request controller 34 of the file memory control unit 16.

The regular access flag 31 is set when the software operation which needs to be carried out periodically within the central control unit 11 ends, and is reset after a predetermined time. When the regular access flag 31 is set, the DMA request controller 34 starts the transfer of the DMA request DMAREQ from the DMA controller 23 within the file memory control unit 16 to the DMA controller 26 within the external bus control unit 19, and carries out a control so as to prohibit the DMA request DMAREQ when the buffer memory 22 becomes full. The halt state of the central control unit 11 is cancelled by the prohibition of the DMA request DMAREQ, and thus, the central control unit 11 can carry out the periodic software operation.

In addition, the timer 32 counts the predetermined time from the time when the halt state of the central control unit 11 is cancelled. When the counting of the predetermined time in the timer 32 ends, the DMA request controller 34 is controlled to a state where the transfer of the DMA request DMAREQ is possible. As a result, if the regular access flag 31 is not set within the predetermined time due to a failure of the central control unit 11 or the like, the DMA transfer is resumed by outputting the DMA request DMAREQ from the DMA controller 23 unconditionally if the data transfer between the buffer memories 21 and 22 and the floppy disk controller 24 or the SCSI protocol controller 25 has ended.

Figure 5:
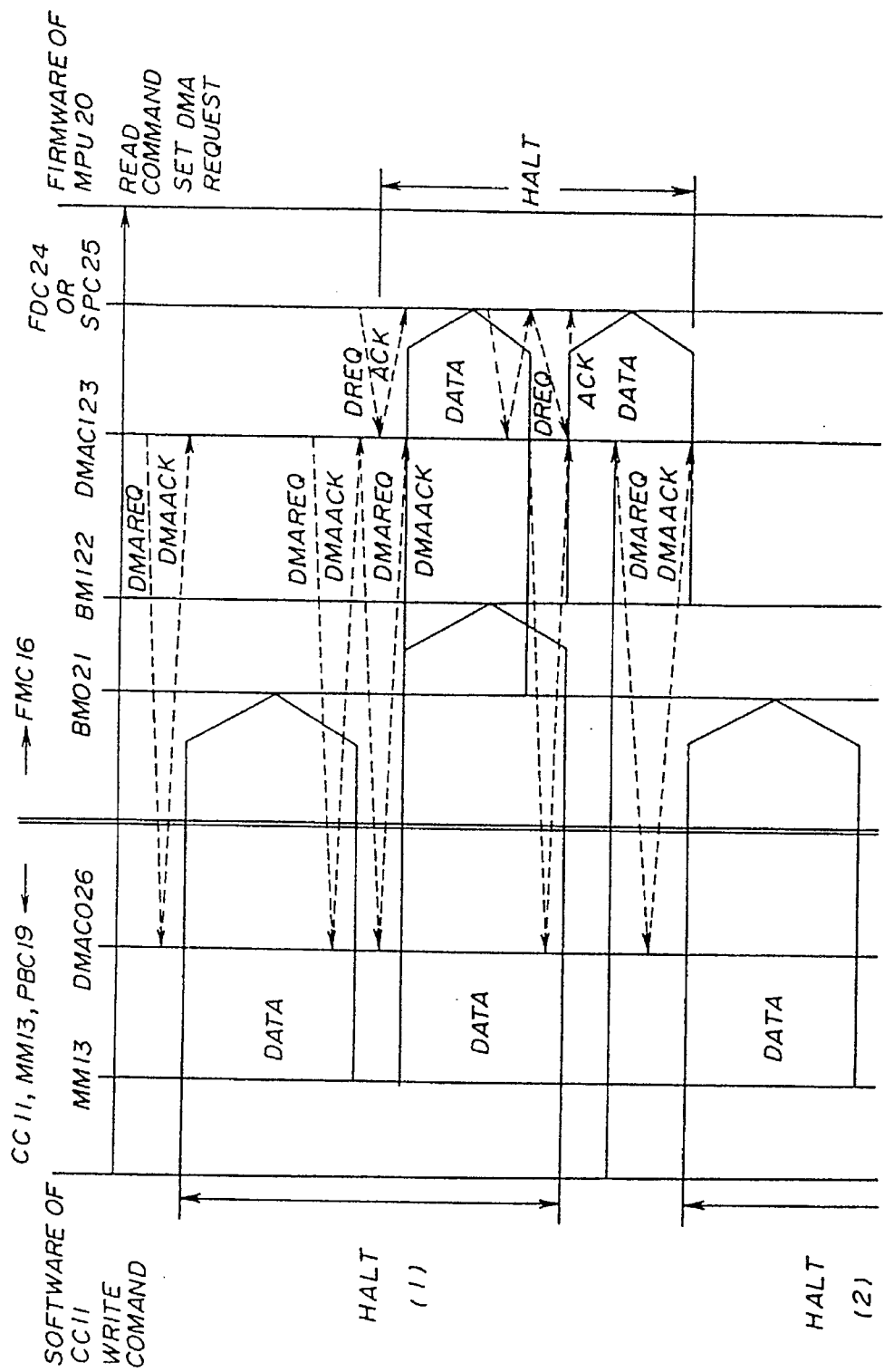
FIG. 5 is an operation time chart for explaining the operation of the embodiment shown in FIG. 4.

FIG. 5 is an operation time chart for explaining the operation of this embodiment. A description will now be given of the data transfer and the like in this embodiment with reference to FIG. 5, and the write transfer operation from the main memory 13 to the floppy disk controller 24 or the SCSI protocol controller 25 in particular.

First, a data transfer command is written from the central control unit 11 to the file memory control unit 16. The file memory control unit 16 which receives the data transfer command sets the DMA controller 23 so as to output a DMA request DMAREQ which requests DMA transfer with respect to the DMA controller 26 of the external bus control unit 19. Hence, the DMA request DMAREQ is output from the DMA controller 23. Responsive to this DMA request DMAREQ, the DMA controller 26 puts the central control unit 11 to a halt state, and starts a data transfer between the main memory 13 and the buffer memory 21.

When the buffer memory 21 becomes full, the DMA controller 23 of the file memory control unit 16 puts the microprocessor unit 20 to a halt state and makes a DMA transfer from the buffer memory 21 to the floppy disk controller 24 or the SCSI protocol controller 25. During this time, the DMA controller 26 of the external bus control unit 19 makes a DMA transfer between the main memory 13 and the buffer memory 22.

When the buffer memory 22 becomes full, the DMA request controller 34 of the file memory control unit 16 stops the output of the DMA request DMAREQ. As a result, the halt state of the central control unit 11 is cancelled and the central control unit 11 starts to carry out the software operation which needs to be carried out periodically. After the software operation of the central control unit 11 ends, the regular access flag 31 is set. Accordingly, the DMA request DMAREQ is output when the DMA transfer between the buffer memory 21 and the floppy disk controller 24 or the SCSI protocol controller 25 ends, so as to resume the DMA transfer from the main memory 13 to the buffer memory 21.

The above described operation is repeated until all of the data to be transferred is transferred from the main memory 13. Therefore, an intermittent DMA transfer is made between the main memory 13 and the floppy disk controller 24 or the SCSI protocol controller 25.

The timer 32 counts the predetermined time from the time when the halt state of the central control unit 11 is cancelled. If the regular access flag 31 is not set within this predetermined time, it is regarded that a failure has occurred in the central control unit 11, and the DMA transfer is resumed by outputting the DMA request DMAREQ unconditionally if the DMA transfer between the buffer memory 21 and the floppy disk controller 24 or the SCSI protocol controller 25 has ended.

Figure 6:
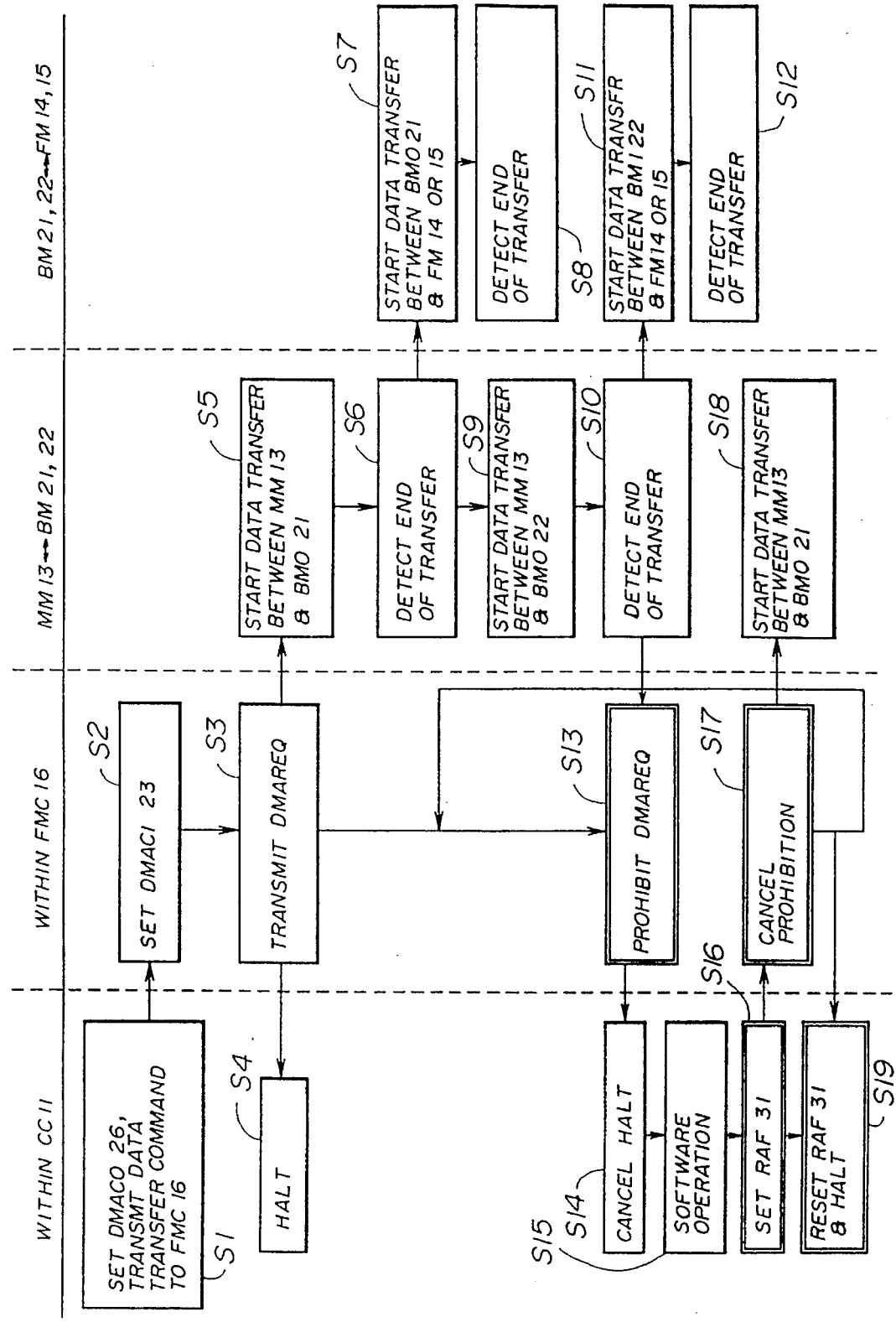
FIG. 6 is a flow chart for explaining the operation of the embodiment shown in FIG. 4.

FIG. 6 is a flow chart for explaining the operation of prohibiting the DMA request DMAREQ and cancelling the prohibition in this embodiment. In FIG. 6, those steps shown by a double frame correspond to the operation related to the DMA request controller 34 and the regular access flag 31. In addition, the steps carried out within the central control unit 11, within the file memory control unit 16, between the main memory 13 and the buffer memories 21 and 22, and between the buffer memories 21 and 22 and the floppy disk controller 24 or the SCSI protocol controller 25 are indicated under the respective columns.

In FIG. 6, a step S1 sets the DMA controller 26 of the external bus control unit 19 by the software of the central control unit 11 and transmits a data transfer command with respect to the file memory control unit 16. A step S2 sets the DMA controller 23 within the file memory control unit 16 in response to the data transfer command, and a step S3 transmits a DMA request DMAREQ from the DMA controller 23 to the DMA controller 26. Hence, a step S4 puts the central control unit 11 in a halt state, and at the same time, a step S5 starts a data transfer between the main memory 13 and the buffer memory 21.

When the buffer memory 21 becomes full and a step S6 detects the end of the data transfer between the main memory 13 and the buffer memory 21, and a step S7 starts a data transfer between the buffer memory 21 and the floppy disk controller 24 or the SCSI protocol controller 25 which is carried out until a step S8 detects the end of the data transfer between the buffer memory 21 and the floppy disk controller 24 or the SCSI protocol controller 25. At the same time, a step S9 starts a data transfer between the main memory 13 and the buffer memory 22 which is carried out until the buffer memory 22 becomes full and a step S10 detects the end of the data transfer between the main memory 13 and the buffer memory 22. A step S11 starts a data transfer between the buffer memory 22 and the floppy disk controller 24 or the SCSI protocol controller 25 which is carried out until a step S12 detects the end of the data transfer between the buffer memory 22 and the floppy disk controller 24 or the SCSI protocol controller 25.

In addition, when the data transfer between the main memory 13 and the buffer memory 22 ends, a step S13 prohibits the output of the DMA request DMAREQ by the DMA request controller 34. As a result, a step S14 cancels the halt state of the central control unit 11, and a step S15 carries out the periodical software operation of the central control unit 11.

Thereafter, a step S16 sets the regular access flag 31. Thus, a step S27 cancels the prohibition of the output of the DMA request DMAREQ. Hence, a step S18 starts a data transfer from the main memory 13 and the buffer memory 21. On the other hand, a step S19 resets the regular access flag 31 after a predetermined time, so as to put the central control unit 11 in the halt state. The prohibition of the output of the DMA request DMAREQ in the step S13 and the cancellation of this prohibition in the step S17 is repeated, thereby enabling the intermittent DMA transfer described above.

In the described embodiment, the present invention is applied to the data transfer between the main memory 13 of the central control unit 11 and the floppy disk unit 14 or the hard disk drive 15 of the file memory control unit 16. However, the present invention is similarly applicable to various kinds of data communication systems. For example, the part of the data communication system referred to as the external memory controller 4 in FIG. 3 may be a data transmitter/receiver which transmits and receives data to and from an external memory unit via another data transmitter/receiver.

Further, the present invention is not limited to these embodiments, but various variations and modifications may be made without departing from the scope of the present invention.

What is claimed is:

1. A memory access control system which performs a DMA transfer, the memory access control system being responsive to a specific software operation and comprising:

a central control unit which includes a flag and runs the specific software operation, the central control unit setting the flag after the running of the specific software operation is completed;

a main memory which is coupled to the central control unit;

a file memory control unit which comprises
first and second buffer memories, the DMA transfer including a first phase and a second phase, the first phase being a first transfer between the main memory and the first buffer memory and then a successive, second transfer between the main memory and the second buffer memory, the second phase being a transfer between a respective buffer memory of the first and second buffer memories and an external memory, the second phase being performed for a respective buffer memory after a transfer between the main memory and the respective buffer memory in the first phase, an external memory controller for controlling the external memory, a first DMA controller for requesting the first phase of a DMA transfer and for controlling the second phase, the first DMA controller controlling the transfer of the second phase from a respective buffer memory when a transfer of the first phase from the main memory to the respective buffer memory ends, and prohibiting a request for the first phase when the first transfer ends during a transfer of the second phase from the second buffer memory, and a DMA request controller which is coupled to the first DMA controller and controls the request for the first phase by the first DMA controller, the DMA request controller prohibiting a request for the first phase by the first DMA controller when the second transfer of the first phase ends and cancelling the prohibition of a request for the first phase when the flag of the central control unit is set; and an external bus control unit, coupled between the main memory and the first and second buffer memories, which, in response to a request for the first phase, halts the operation of the central control unit and performs the first and second transfers of the first phase, and stops halting the operation of the central control unit when a request for the first phase is prohibited.

2. The memory access control system as claimed in claim 1, further comprising:

a first bus which couples the central control unit and the main memory, wherein said file memory control unit comprises a second bus which is coupled to the first and second buffer memories, said external bus control unit being coupled to the first and second buses.

3. The memory access control system as claimed in claim 2, wherein the file memory control unit further comprises a third bus which couples the first DMA controller, the external memory controller and the first and second buffer memories.

4. The memory access control system as claimed in claim 1, wherein said external bus control unit includes a second DMA controller, coupled to the DMA request controller, for controlling transfers between the main memory and the file memory control unit.

5. The memory access control system as claimed in claim 1, wherein the external memory comprises at least one of a floppy disk unit and a hard disk unit.

6. The memory access control system as claimed in claim 5, wherein the external memory controller comprises a floppy disk controller for controlling the floppy disk unit, and a protocol controller for controlling the hard disk unit.

7. The memory access control system as claimed in claim 1, wherein the central control unit further comprises:

a timer which counts a predetermined time from when the DMA request controller cancels the prohibition of a request for the first phase, wherein the DMA request controller cancels the prohibition of a request for the first phase when the flag of the central control unit is not set within the predetermined time counted by the timer.

8. The memory access control system as claimed in claim 7, further comprising:

a communication line which bypasses the external bus control unit and connects the central control unit to the file memory control unit, wherein, when the flag of the central control unit is not set within the predetermined time, the central control unit transmits a signal to the file memory control unit via the communication line.

9. The memory access control system as claimed in claim 1, wherein a data transfer speed between the main memory and the first and second buffer memories is approximately the same as a data transfer speed between the first and second memories and the external memory.

10. The memory access control system as claimed in claim 1, wherein a data transfer speed between the main memory and the first and second buffer memories is less that or equal to a data transfer speed between the first and second memories and the external memory.

* * * * *

UNITED STATES PATENT AND TRADEMARK OFFICE
CERTIFICATE OF CORRECTION

PATENT NO. : 5,623,622
DATED : Apr. 22, 1997
INVENTOR(S) : YUKI et al.

It is certified that error appears in the above-indentified patent and that said Letters Patent is hereby corrected as shown below:

Col. 1,  line 37, change "(PBC) unit" to --unit (PBC)--.

Col. 5,  line 9, change "controller 5" to --controller (DMAC) 5--;
line 10, delete "(DMAC)".

Signed and Sealed this

Nineteenth Day of August, 1997

Attest:

BRUCE LEHMAN

*Attesting Officer*    *Commissioner of Patents and Trademarks*